(12) United States Patent
Kume et al.

(10) Patent No.: US 9,910,163 B2
(45) Date of Patent: Mar. 6, 2018

(54) ALPHA RAY OBSERVATION DEVICE AND ALPHA RAY OBSERVATION METHOD

(71) Applicant: KABUSHIKI KAISHA TOSHIBA, Minato-Ku (JP)

(72) Inventors: Naoto Kume, Yokohama (JP); Kei Takakura, Yokohama (JP); Hidehiko Kuroda, Yokohama (JP); Yukio Yoshimura, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/327,717

(22) PCT Filed: Jul. 23, 2015

(86) PCT No.: PCT/JP2015/070957
§ 371 (c)(1),
(2) Date: Jan. 20, 2017

(87) PCT Pub. No.: WO2016/013610
PCT Pub. Date: Jan. 28, 2016

(65) Prior Publication Data
US 2017/0205513 A1    Jul. 20, 2017

(30) Foreign Application Priority Data
Jul. 25, 2014  (JP) ................. 2014-152438

(51) Int. Cl.
*G01T 1/167* (2006.01)
*G01T 7/00* (2006.01)

(52) U.S. Cl.
CPC ............... *G01T 1/167* (2013.01); *G01T 7/00* (2013.01)

(58) Field of Classification Search
CPC .................. G01T 1/167; G01T 7/00
See application file for complete search history.

(56) References Cited

U.S. PATENT DOCUMENTS 4,442,358 A * 4/1984 Kreiner ............... G01T 7/04
250/364
4,983,834 A * 1/1991 Lindmayer ........ C09K 11/7786
250/363.01

(Continued)

FOREIGN PATENT DOCUMENTS

EP    2 853 925 A2    4/2015
JP    11-64529 A    3/1999

(Continued)

OTHER PUBLICATIONS

Sand et al., Remote Optical Detection of Alpha Radiation, Nov. 2010, International Atomic Energy Agency, vol. 42, pp. 1-7.*

(Continued)

*Primary Examiner* — Christine Sung
(74) *Attorney, Agent, or Firm* — Oblon, McClelland, Maier & Neustadt, L.L.P.

(57) ABSTRACT

An alpha ray observation device and an alpha ray observation method are provided that can correctly evaluate a signal derived from alpha rays. The alpha ray observation device according to an embodiment includes a device housing 10, an incident window 2, a condenser 3, an optical path changer 4, and a first optical detector 5. The device housing 10 is provided with an opening. The incident window 2 is provided at the opening, and can block beta rays. Emitted light originated by alpha rays caused from the measurement object set outside of the device housing 10 enters the inside of the device housing 10 through the incident window 2 with beta rays being blocked, and is condensed by the condenser 3, and the optical path is changed by the optical path changer 4, and subsequently the light is detected by the first optical detector 5. The first optical detector 5 outputs a signal according to the amount of detected light.

14 Claims, 5 Drawing Sheets

(56) References Cited

U.S. PATENT DOCUMENTS

| | | | |
|---|---|---|---|
| 6,281,502 B1 | 8/2001 | Pineau et al. | |
| 6,674,082 B1* | 1/2004 | Gunn | G01T 1/169 |
| | | | 250/363.01 |
| 6,809,413 B1* | 10/2004 | Peterson | B81B 7/0067 |
| | | | 257/680 |
| 9,279,889 B2* | 3/2016 | Kume | G01T 1/178 |
| 2006/0208197 A1 | 9/2006 | Hasegawa et al. | |
| 2008/0179534 A1* | 7/2008 | Singh | G01J 1/429 |
| | | | 250/372 |
| 2009/0039270 A1* | 2/2009 | Cabral, Jr. | G01T 1/244 |
| | | | 250/366 |
| 2012/0112076 A1* | 5/2012 | Rosson | G01N 21/6402 |
| | | | 250/361 R |
| 2012/0112099 A1* | 5/2012 | Coleman | G01T 7/00 |
| | | | 250/473.1 |
| 2013/0320220 A1* | 12/2013 | Donowsky | G01T 7/00 |
| | | | 250/366 |
| 2015/0323678 A1* | 11/2015 | Kuroda | G01T 1/169 |
| | | | 250/370.02 |
| 2015/0369932 A1* | 12/2015 | Kume | G01T 1/205 |
| | | | 250/370.02 |

FOREIGN PATENT DOCUMENTS

| | | |
|---|---|---|
| JP | 2000-507698 A | 6/2000 |
| JP | 2006-154376 A | 6/2006 |
| JP | 2006-258755 | 9/2006 |
| JP | 2013-250108 A | 12/2013 |
| JP | 2015-68791 | 4/2015 |

OTHER PUBLICATIONS

Baschenko, Sergiy M., Remote optical detection of alpha particle sources, 2004, J. Radiol. Prot., vol. 24, pp. 75-82.*

International Search Report dated Nov. 24, 2015, in PCT/JP2015/070957, filed Jul. 23, 2015.

* cited by examiner

ALPHA RAY OBSERVATION DEVICE AND ALPHA RAY OBSERVATION METHOD

TECHNICAL FIELD

Embodiments of the present invention relate to an alpha ray observation device and an alpha ray observation method that observe alpha rays through measurement of occurring light generated by the alpha rays.

BACKGROUND ART

As detectors of alpha rays among those of radiant rays, detectors that include ZnS scintillators have been known, for example. The ZnS scintillators emit light when the alpha rays enter. On the other hand, there are alpha ray observation devices that use the fact that alpha rays cause nitrogen in the atmosphere to emit light, and detect alpha rays by observing light emitted from the nitrogen to allow alpha rays to be observed even from a remote site. The emitted light is ultraviolet rays.

FIG. 9 is a configuration diagram showing a conventional example of an alpha ray observation device that detects alpha rays through observation of light emitted from nitrogen.

The alpha ray observation device as shown in FIG. 9 has been known; the device includes a condenser lens 101 that condenses light emitted from nitrogen, a wavelength selecting element 102 that extracts light emitted from nitrogen from the condensed light, an optical element 103 that divides the extracted light emitted from nitrogen into transmitted light and reflected light, a direction changer 104 that changes the propagation direction of the reflected light, optical detectors 105a and 105b that receive the transmitted light and the reflected light and count the number of photons, and a signal processor 106 that selects the light emitted from nitrogen due to alpha rays by causing the optical detectors 105a and 105b to measure the transmitted light and the reflected light simultaneously.

PRIOR ART DOCUMENTS

Patent Documents

Patent Document 1: Japanese Patent Laid-Open No. 2000-507698

SUMMARY OF THE INVENTION

Problems to be Solved by the Invention

The device as described above can detect alpha rays at a higher sensitivity than other radiant rays, such as beta rays. Unfortunately, the alpha ray detection is inevitably affected by beta rays and gamma rays. There is thus a problem in that in an environment with high doses of ambient beta rays and gamma rays or in a case with a high contamination level due to beta nuclides and gamma nuclides to be measured (beta contamination and gamma contamination), alpha rays cannot be measured through the device as described above.

The present invention has been made to solve the above problem, and has an object to provide an alpha ray observation device and an alpha ray observation method that can correctly evaluate a signal derived from alpha rays even in the case with a high doses of ambient beta rays and gamma rays in the measurement environment or in the case with high beta contamination and gamma contamination to be measured.

Means for Solving the Problem

To solve the above problem, an alpha ray observation device according to each embodiment of the present invention includes:

a device housing having an opening;

an incident window that is provided at the opening, allows beta rays to be blocked, and allows emitted light originated by alpha rays emitted from a measurement object set outside of the device housing to enter an inside of the device housing;

a condenser that is provided in the device housing, and condenses the emitted light;

an optical path changer that is provided in the device housing, and changes an optical path of the emitted light from an incident direction from the incident window; and a first optical detector that is provided in the device housing, and detects the emitted light which has been condensed by the condenser and whose optical path has been changed by the optical path changer.

Furthermore, an alpha ray observation method according to each embodiment of the present invention includes:

setting a measurement object outside of a device housing;

allowing emitted light originated by alpha rays emitted from the measurement object to enter an inside of the device housing while blocking beta rays;

condensing the emitted light having entered the inside of the device housing, while changing an optical path of the light; and detecting the emitted light which has been condensed and whose optical path has been changed, and outputs a detection signal according to an amount of the emitted light.

Advantages of the Invention

The present invention can correctly evaluate a signal derived from alpha rays.

DESCRIPTION OF EMBODIMENTS

Each of embodiments of the present invention is hereinafter described with reference to the drawings.

First Embodiment

Figure 1:
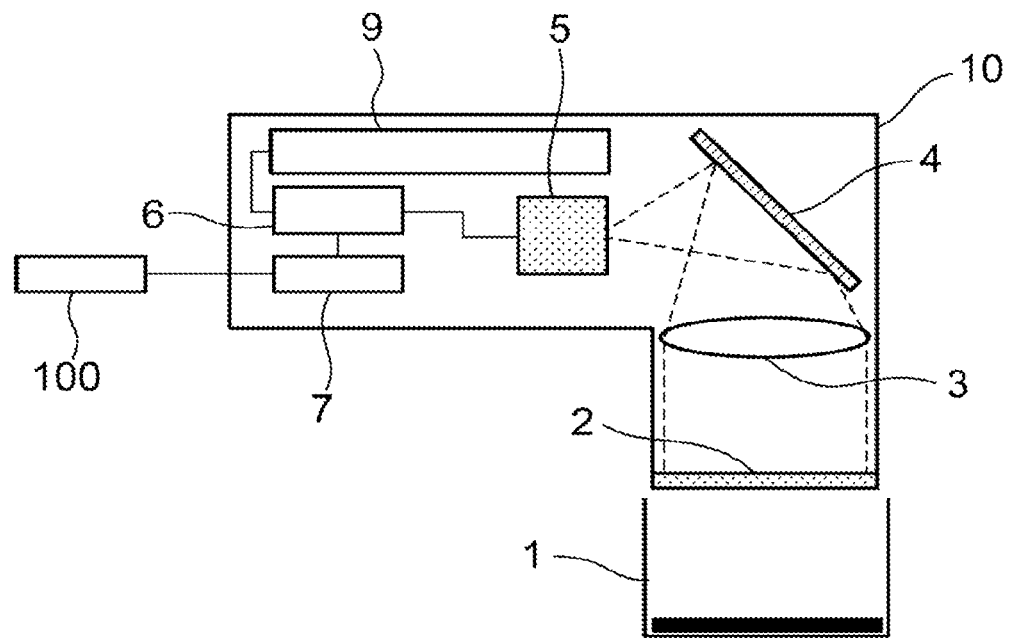
FIG. 1 is a configuration diagram showing an alpha ray observation device according to a first embodiment.
Figure 2:
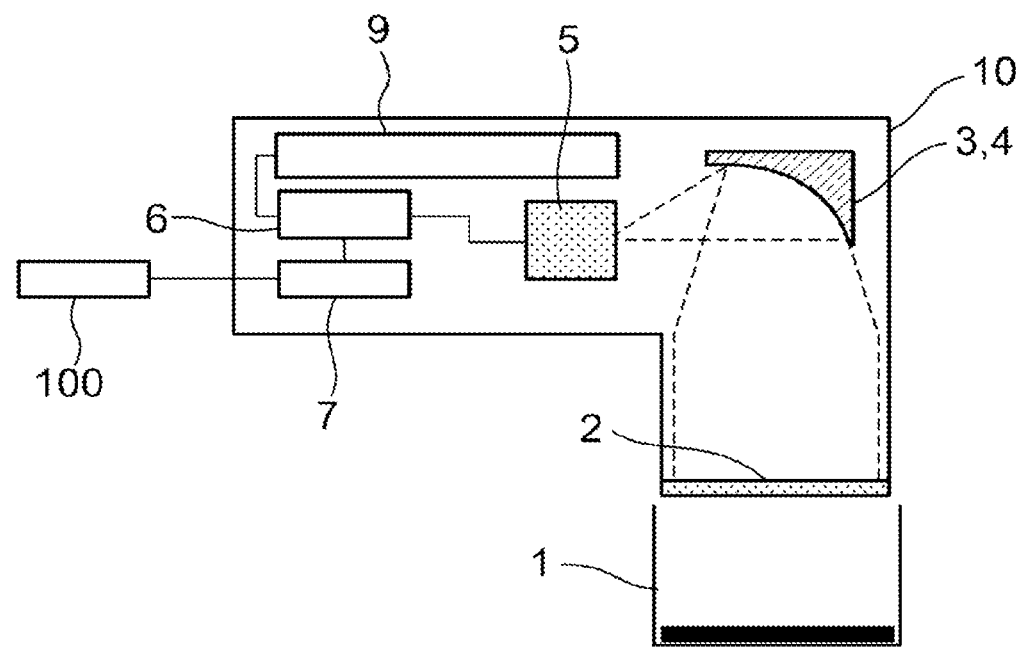
FIG. 2 is a configuration diagram showing a modified example of an alpha ray observation device according to the first embodiment.

FIG. 1 is a configuration diagram showing an alpha ray observation device according to a first embodiment of the present invention. FIG. 2 is a configuration diagram showing a modified example of the first embodiment shown in FIG. 1. In FIGS. 1 and 2, the same configuration elements are assigned the same signs. Redundant detailed description of these elements is omitted.

In FIGS. 1 and 2, sign 1 denotes a measurement chamber in which a measurement object is set. Sign 2 denotes an incident window that allows light emitted due to alpha rays contained in the measurement object arranged in the measurement chamber 1 to pass therethrough and enter. Sign 3 denotes a condenser that condenses the rays having passed through the incident window 2. Sign 4 denotes an optical path changer that changes the traveling path (optical path) of the light. Sign 5 denotes a first optical detector that detects the rays which have been condensed by the condenser 3 and whose optical path has been changed by the optical path changer 4. Sign 6 is a signal detector that detects a signal generated by the first optical detector 5. Sign 7 denotes signal communicator that communicates the signal obtained by the signal detector 6 to an external device. Sign 9 denotes a power source that supplies power. Sign 100 denotes a display that receives the signal transmitted from the signal communicator 7 and displays the signal.

Sign 10 denotes a device housing in which the incident window 2, the condenser 3, the optical path changer 4, the first optical detector 5, the signal detector 6, the signal communicator 7, and the power source 9 are accommodated or arranged. The incident window 2 is provided at the opening of the device housing 10. Preferably, the device housing 10 is configured to be made of a material that can block rays detectable by the optical detector 5, and configured to prevent light from entering except through the incident window 2. Preferably, the device housing 10 is made of a material that can block beta rays or has dimensions therefor. Furthermore, an antireflective member made of a light-absorbable material is arranged on the inner surface of the device housing 10 to prevent rays from being diffusively reflected. Alternatively, the device housing 10 itself may be made of a light-absorbable material.

One side of the measurement chamber 1 (device housing side) can be connected to the device housing 10 at a site provided with the incident window 2, that is, the opening of the device housing 10. A configuration is secured where when the measurement chamber 1 is mounted onto the device housing 10 to communicate therewith, light outside of the measurement chamber 1 is prevented from entering the inside of the device housing 10 through the opening at which the incident window 2 is provided.

A measurement object is set on the other side of the measurement chamber 1 (measurement object side). The measurement object can be set in the measurement chamber 1 by configuring a closed portion on the other side of the measurement chamber 1 and arranging the measurement object at the closed portion, for example. Alternatively, the object may be set by bringing the measurement chamber 1 close to the measurement object while letting the other end of the measurement chamber 1 open, to prevent external light from entering the inside of the measurement chamber 1.

That is, the measurement chamber 1 is configured as a sealed container that prevents light outside of the measurement object from entering the inside of the device housing 10 through the incident window 2, in a state where the measurement chamber 1 is mounted onto the device housing 10 on the device housing side of this chamber to be connected with the housing, and the measurement object is set on the measurement object side. The shape of the measurement chamber 1 on the measurement object side may be configured in conformity with the size of the measurement object. The shape and material of the measurement chamber 1 may be any of various shapes and materials as long as the shape and material can prevent light outside of the measurement chamber 1 from entering the inside of the device housing 10 from the measurement chamber 1.

In the first embodiment shown in FIGS. 1 and 2, the measurement chamber 1 has a cylindrical shape with the measurement object side being closed. The opening of the device housing 10 at which the incident window 2 is provided is a cylinder having a slightly smaller diameter than the cylinder constituting the measurement chamber 1 does. Such a configuration allows the measurement chamber 1 to mate with the cylinder, which constitutes the opening of the device housing 10, on the device housing side, to thus allow the measurement chamber 1 to be mounted on and connected with the device housing 10. Although not shown, felt or blackout curtain is provided on the inner periphery of the measurement chamber 1 on the device housing side or the outer periphery of the cylinder of the opening of the device housing 10; this configuration blocks a gap in the state where the measurement chamber 1 is mated with the device housing 10, and enables the inside of the measurement chamber 1 to serve as a darkroom.

As described above, besides the shapes shown in FIGS. 1 and 2, a shape of the measurement chamber 1 on the device housing side may be adopted that has, for example, a structure where one side of the cylinder is open and which forms a darkroom with blackout curtain or felt in conformity with the shape formed by the wall to be measured, piping and the like only in a case of close arrangement. The distance between the device housing side of the measurement chamber 1, that is, the site of connection to the device housing 10 and the measurement object side of the measurement chamber 1, that is, the site where the measurement object is set is configured to be at least the range of alpha rays, for example, approximately 5 cm.

The incident window 2 may be made up of what allows light generated by alpha rays to pass therethrough. For example, when alpha rays excite nitrogen, the nitrogen emits light in a range from 310 to 450 nm. Accordingly, a synthetic silica lens, a glass product made of non-fluorescent glass or the like may be adopted. The material of the incident window 2 is not specifically limited. Any material that allows light in a range from 310 to 450 nm to pass therethrough is appropriately adopted. As described later, the incident window 2 is made of a beta-ray shield member. Preferably, a material and dimensions that have an effect of blocking beta rays are appropriately adopted.

The condenser 3 condenses light emitted from nitrogen due to alpha rays. The optical path changer 4 changes the traveling direction of light emitted from the nitrogen due to alpha rays. In the first embodiment shown in FIG. 1, an example is illustrated where the condenser 3 uses synthetic silica glass or the like to allow the passing light to be condensed, and the direction of the light having passed is changed by a flat plate mirror (planar mirror) by 90°.

In addition, as in a modified example shown in FIG. 2, adoption of another configuration that condenses reflected light by a parabolic mirror made of metal allows the condenser 3 and the optical path changer 4 to be integrated into one component. Coating for improving condensing efficiency may be applied to the condenser 3 and the optical path changer 4 irrespective of whether these elements are for condensing transmitted light as shown in FIG. 1 or for condensing reflected light as shown in FIG. 2.

Instead of the planar mirror (mirror) and the parabolic mirror made of metal, any of various optical components, such as prisms and crystal lattices, may be adopted as the optical path changer 4 as long as the element can change the traveling direction of light around 337 nm emitted from nitrogen due to alpha rays. For example, any mirror coated with UV-reflection reinforced aluminum or the like may be adopted so as to reflect ultraviolet rays around 337 nm that are light emitted from an alpha ray source.

In this embodiment and its modified example shown in FIGS. 1 and 2, the optical path changer 4 changes the traveling direction of the light by 90°. Alternatively, an angle other than 90° may be adopted as long as the detection element of the first optical detector 5, described later, is not directly oriented in the direction toward the measurement object of the measurement chamber 1. A synthetic silica lens may be adopted as the incident window 2 and the condenser 3. Unfortunately, it has been known that the synthetic silica lens emits faint light due to radiant rays. Use of what does not contain silica, such as a parabolic mirror made of non-fluorescent glass or metal, instead of the synthetic silica lens, can prevent light due to radiant rays from being emitted.

The first optical detector 5 can detect light around 337 nm emitted from nitrogen due to alpha ray source. More specifically, a detector such as a photomultiplier tube or a multi-pixel photon counter (MPPC), a cooled CCD, a CMOS camera or the like may be adopted. An array configuration of photomultiplier tubes or MPPCs can obtain multiple two-dimensional data items. A cooled CCD can change the sensitivity by performing binning or the like. The position where the first optical detector 5 is mounted in the device housing 10 can be determined on the basis of the focal length of the condenser 3 and the measurement range.

The signal detector 6 is for detecting a signal generated by the first optical detector 5. For example, in a case where a photomultiplier tube is adopted as the first optical detector 5, what has a function of counting pulses, or increase in signal pulses generated photon-by-photon basis, may be adopted. Irrespective of the type of the first optical detector 5, what can detect the amount of rays entering the detector may be adopted.

The signal communicator 7 is used to control a function for outputting the signal of the amount of rays measured by the signal detector 6 to the outside, turning on and off the device from the outside, and control of measurement time, and includes a control circuit such as a microcomputer, FPGA, and PC, a USB cable, a network connection cable and other cables.

The power source 9 can supply power source required for the operations of the first optical detector 5, the signal detector 6, the signal communicator 7 and the display 100.

Any of elements that can supply power, such as a 100-V alternating-current power source or the like and an internal battery from the outside, may be adopted.

The display 100 receives the signal detected by the signal detector 6 through the signal communicator 7 and displays the signal. More specifically, the display 100 can be achieved by adopting a display provided outside of a PC or the like, a small-sized LED monitor provided on the surface of the measurement device or the like.

The operation of the thus configured alpha ray observation device according to the first embodiment of the present invention, and an alpha ray observation method according to the first embodiment of the present invention are hereinafter described.

First, on the measurement object side of the measurement chamber 1, the measurement object as an alpha ray source whose intensity of alpha rays is to be measured is set, and the device housing side of the measurement chamber 1 is connected to the device housing 10. In a state where the measurement chamber 1 is mounted on the device housing 10, light outside of the measurement chamber 1 is prevented from entering the inside of the device housing 10 through the opening at which the incident window 2 is provided. Emission of alpha rays from the measurement object set in the measurement chamber 1 excites nitrogen in the atmosphere to emit light in an ultraviolet region even though the light is faint. Here, the distance between the device housing side and the measurement object side of the measurement chamber 1 is configured to be the distance at least the range of alpha rays; this configuration increases the amount of the emitted light due to alpha rays as much as possible. The alpha ray observation device according to this embodiment detects the emission of ultraviolet rays; through this detection, the intensity of alpha rays is measured.

The dose of ultraviolet rays emitted due to a single type of radiant rays depends on an energy supplied by the radiant rays to nitrogen in the air. As shown below, the energy of alpha rays is several mega-electron volts while the energy of beta rays is low. As the range of alpha rays in the air is short, the energy supplied per unit length is about 0.2% to 1%.

| Main radiant rays of main nuclides | | | |
| --- | --- | --- | --- |
| Nuclide range (cm) | Radiant ray type | Energy (MeV) | Maximum |
| Am-241 | Alpha | 5.468 | 4.1 |
| Cs-137 | Beta | 0.514 | 135 |
| Y-80 | Beta | 2.28 | 915 |

The single type of radiant rays has small effect of beta rays. However, when the measurement object contains beta rays 1000 times as much as alpha rays, there is a possibility that the amount of emitted rays due to alpha rays and the amount of ray emission due to beta rays are equivalent to each other. Consequently, it is important to block beta rays as soon as possible. The incident window 2 is provided distant from the measurement object by at least the range of alpha rays, for example, 5 cm, so as not to reduce the amount of emitted light due to alpha rays. The incident window 2 absorbs beta rays. This absorption can reduce emission of beta rays without reducing the amount of alpha ray emission. Although the amount of alpha ray emission becomes slightly small, beta ray emission can be reduced. Consequently, the incident window 2 can be provided at a distance equal to or smaller than the range of alpha rays.

Beta rays have approximately several millimeters at the maximum in aluminum. The glass adopted as the incident window 2, such as quartz glass, has a density equivalent to that of aluminum. Consequently, the incident window 2 having a thickness of several millimeters can block beta rays.

Emitted ultraviolet rays that have been originated by alpha rays, passed through the incident window 2 and entered the inside of the device housing 10 while beta rays have been blocked are condensed by the condenser 3 in order to be measured efficiently by the first optical detector 5. Furthermore, the traveling direction of the rays is changed by the optical path changer 4. The first optical detector 5 detects the ultraviolet rays which have been originated by alpha rays and whose traveling direction has been changed by being condensed as described above. In particular, this embodiment adopts the configuration that causes the optical path changer 4 to change the direction (optical path), and thus achieves the arrangement that prevents the detection element of the first optical detector 5 from being directly oriented toward the measurement object of the measurement chamber 1. Consequently, adverse effects on the first optical detector 5 due to the beta rays radiated from the measurement object can be reduced. Even in a case where the beta rays from the measurement object are radiated in the direction toward the first optical detector 5 without passing through the incident window 2, the beta rays can be blocked by the device housing 10.

The distance between the condenser 3 and the first optical detector 5 is determined by the focal length of the condenser 3, the size of the measurement object, and the sensible range of the first optical detector 5. Appropriate setting of this distance enables the measurement to be highly sensitive. Configuration of the magnification m of at least h/L, where h is the size of the measurement object and L is the sensible range of the first optical detector 5, is a necessary condition for achieving such high sensitivity. Here, the magnification m is m=D2/D1, where D1 is the distance between the condenser 3 and the first optical detector 5, and D2 is the distance between the condenser 3 and the measurement object. That is, the following relationship is required between the size h of the measurement object, the sensible range L of the first optical detector 5, the distance D1 between the condenser 3 and the first optical detector 5, and the distance D2 between the condenser 3 and the measurement object.

$$D2/D1 \geq h/L \quad (1)$$

Furthermore, the following relationship holds between the focal length f of the condenser 3, the distance D1 between the condenser 3 and the first optical detector 5, and the distance D2 between the condenser 3 and the measurement object.

$$1/f = 1/D1 + 1/D2 \quad (2)$$

Use of these expressions (1) and (2) can determine the sensible range L of the first optical detector 5 and the focal length f of the condenser 3 in conformity with the maximum assumable size h of the measurement object, for example.

The first optical detector 5 generates a signal according to the emission of incident ultraviolet rays originated by alpha rays. In a case where a photomultiplier tube is adopted as the first optical detector 5, the number of obtained signal pulses or the amount of charges of the signal pulses is calculated to be converted into the amount of rays. The signal detector 6 detects the signal of the amount of emitted rays generated in the first optical detector 5, and outputs the signal (detection signal) of the amount of rays to the signal communicator 7.

The signal communicator 7 outputs the signal of the amount of rays measured by the signal detector 6 to the display 100, receives the control signals for turning power on and off the device and the measurement time from the outside, and controls the entire alpha ray observation device including the first optical detector 5, the signal detector 6, and the power source 9. The power source 9 supplies power required for the operations of the first optical detector 5, the signal detector 6, the signal communicator 7, and the display 100.

As described above, the alpha ray observation device and the alpha ray observation method according to this embodiment can correctly evaluate the signal due to emitted ultraviolet rays originated by alpha rays. In particular, according to this embodiment, the configuration provided with the incident window 2 at the position distant from the measurement object by at least the range of alpha rays, for example, can reduce light emission from the measurement object due to beta rays, and correctly evaluate the signal due to the emitted ultraviolet rays originated by alpha rays even when the dose of beta rays in the measurement environment or beta contamination to be measured is high.

The configuration that allows the device housing side of the measurement chamber 1 to be connected to the opening of the device housing 10 can prevent light outside of the measurement chamber 1 in which the measurement object is set from entering the device housing 10, and correctly evaluate the signal of ultraviolet rays originated by alpha rays. Furthermore, the configuration that causes the first optical detector 5 to detect the rays whose optical path is changed by the optical path changer 4 can reduce, to be low, the adverse effect of possible beta rays incapable of being blocked by the incident window 2.

Second Embodiment

Figure 3:
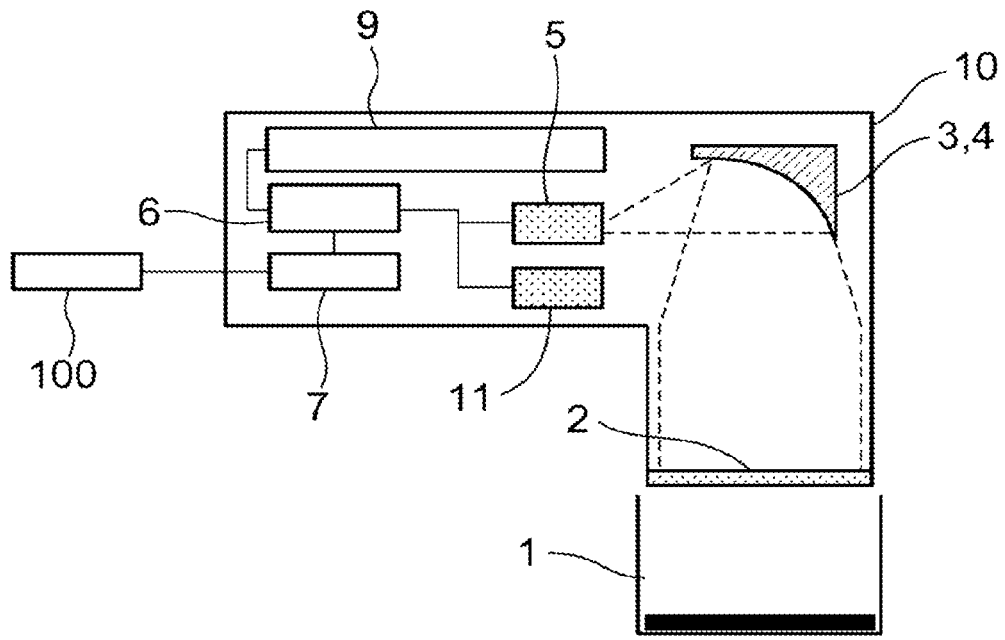
FIG. 3 is a configuration diagram showing an alpha ray observation device according to a second embodiment.

Next, an alpha ray observation device and an alpha ray observation method according to a second embodiment of the present invention are described. FIG. 3 is a configuration diagram showing the alpha ray observation device according to the second embodiment of the present invention. In FIG. 3, the configuration elements analogous to those of FIGS. 1 and 2 are assigned the same signs. Redundant detailed description of these elements is omitted.

According to the second embodiment shown in FIG. 3, in addition to the first optical detector 5, a second optical detector 11 is provided in the device housing 10 of the alpha ray observation device of the modified example of the first embodiment shown in FIG. 2. The other configuration elements are analogous to those of the alpha ray observation device according to the modified example of the first embodiment.

The second optical detector 11 is arranged in parallel to the first optical detector 5 in this embodiment. The detection element of the second optical detector 11 is provided at a position where ultraviolet rays that have been originated by alpha rays, entered through the incident window 2, and passed through the condenser 3 and the optical path changer 4 to be condensed and gained a changed traveling direction are not in the condensed state. That is, the second optical detector 11 is provided at a position where the emitted ultraviolet rays originated by alpha rays emitted from the measurement object in the measurement chamber 1 in the device housing 10 do not enter. The second optical detector 11 and the first optical detector 5 have performances equivalent to each other. The signal of the amount of rays generated by the second optical detector 11 is input into the signal detector 6. The signal detector 6 is configured to detect signals generated by the first optical detector 5 and the second optical detector 11.

The operation of the thus configured alpha ray observation device according to the second embodiment and the alpha ray observation method are hereinafter described.

In a case where the measurement object contains beta rays or gamma rays, there is a possibility that the rays react with the air inside of the device housing 10 to emit light. The second embodiment correctly evaluates the signal due to emission of ultraviolet rays originated by alpha rays even in such situations.

That is, when the air in the incident window 2 and the device housing 10 emits light due to beta rays and gamma rays, the second optical detector 11 detects the amount of emitted light. Ultraviolet rays which have been originated by alpha rays from the measurement object, entered through the incident window 2 and passed through the condenser 3 and the optical path changer 4 to be condensed and whose traveling direction is changed do not enter the detection element of the second optical detector 11. Consequently, in particular, only emission of light from the air in the device housing 10 can be detected. Meanwhile, not only the ultraviolet rays which have been originated by alpha rays from the measurement object, entered through the incident window 2 and passed through the condenser 3 and the optical path changer 4 to be condensed and whose traveling direction is changed, but also light emission from the air in the device housing 10 due to beta rays and gamma rays enter the detection element of the first optical detector 5.

Subtraction of the amount of rays detected by the second optical detector 11 from the amount of rays detected by the first optical detector 5 detects the amount of ultraviolet rays which have been originated by alpha rays from the measurement object, entered through the incident window 2 and passed through the condenser 3 and the optical path changer 4 to be condensed and whose traveling direction is changed. The difference between the signal of amount of rays from the first optical detector 5 and the signal of amount of rays from the second optical detector 11 can be calculated by the signal detector 6 or the signal communicator 7.

Furthermore, the measurement sensitivity in the environment where beta rays and gamma rays reside may be preliminarily calibrated by the signal detector 6 or the signal communicator 7 according to the mounting position of the first optical detector 5 and the second optical detector 11 and the type of the condenser 3, and data only on alpha rays may be calculated from data obtained by the first optical detector 5 and the second optical detector 11 on the basis of the result of calibration.

This embodiment can exert advantageous effects analogous to those of the first embodiment. The ultraviolet rays originated by alpha rays from the measurement object, and the emission of light originated by beta rays and gamma rays in the air in the incident window 2 and the device housing 10 are cannot be discriminated from each other according to the wavelengths. However, this embodiment can correctly evaluate the signal of emission of ultraviolet rays originated by alpha rays from the measurement object even in a case where the air in the incident window 2 and the device housing 10 emit light owing to beta rays and gamma rays.

Third Embodiment

Figure 4:
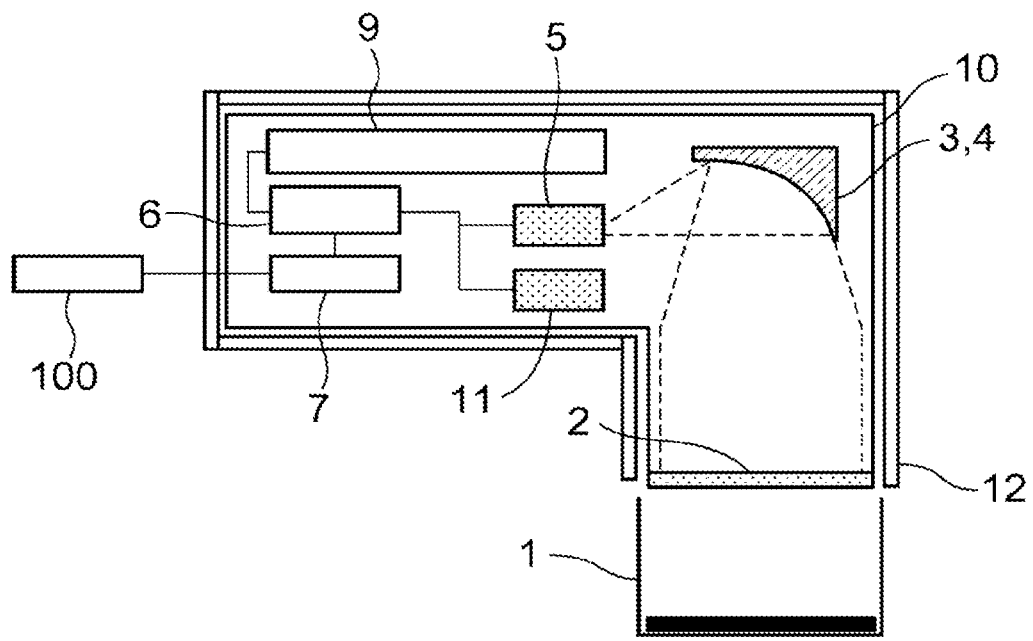
FIG. 4 is a configuration diagram showing an alpha ray observation device according to a third embodiment.

An alpha ray observation device and an alpha ray observation method according to a third embodiment of the present invention are described. FIG. 4 is a configuration diagram showing the alpha ray observation device according to the third embodiment of the present invention. In FIG. 4, the configuration elements analogous to those of FIGS. 1 to 3 are assigned the same signs. Redundant detailed description of these elements is omitted.

The alpha ray observation device in FIG. 4 is a further modified example of the alpha ray observation device of the second embodiment shown in FIG. 3, and is also applicable to the alpha ray observation devices of the first embodiment shown in FIGS. 1 and 2.

The alpha ray observation device in FIG. 4 is the alpha ray observation device of the second embodiment shown in FIG. 3 with the outside of the device housing 10 being covered with a shield 12 except the opening at which the incident window 2 is provided. The shield 12 is for blocking radiant rays, such as gamma rays, and is made of a metal with a high density, such as lead, tungsten, gold, or iron, for example. In this embodiment in FIG. 4, the entire peripheral surface of the device housing 10 is covered except the opening at which the incident window 2 is provided. Alternatively, a configuration where the peripheries of the first optical detector 5 and the second optical detector 11 in the device housing 10 except their detection elements are covered may be adopted to thereby minimize the amount of shield. The other configuration elements are analogous to those of the alpha ray observation device according to the second embodiment. The measurement chamber 1 is connected to and thus mounted on the device housing 10. In this embodiment, the shield 12 is provided so as to cover the outside of the connection portion of the measurement chamber 1. The other configuration elements are analogous to those of the alpha ray observation device according to the second embodiment.

The operation of the thus configured alpha ray observation device according to the third embodiment and the alpha ray observation method are hereinafter described.

Among beta rays and gamma rays contained in the measurement object, the gamma rays have a high transmission power, and pass through these elements and enter the inside of the device housing 10 even if the device housing 10 and the incident window 2 are configured so as to allow the device housing 10 and the incident window 2 to block the beta rays. Consequently, covering the periphery of the device housing 10, or the peripheries first optical detector 5 and second optical detector 11 with the shield 12 for blocking gamma rays can reduce the adverse effects due to gamma rays.

The front and back of the incident window 2, and the detection elements of the first optical detector 5 and the second optical detector 11 cannot be blocked with the shield 12 because such blocking in turn blocks the ultraviolet rays originated by the alpha rays from the measurement object. As described above, in each embodiment, the configuration that causes the optical path changer 4 to change the direction (optical path) achieves the arrangement where the detection elements of the first optical detector 5 and the second optical detector 11 are not directly oriented toward the measurement object in the measurement chamber 1. Consequently, even if gamma rays enter through the incident window 2, the rays travel straight, and can prevent the rays from entering the detection elements of the first optical detector 5 and the second optical detector 11.

This embodiment can exert the working and advantageous effects analogous to those of the first and second embodiments. Furthermore, this embodiment can reduce the adverse effects due to gamma rays on the first optical detector 5 and the second optical detector 11 by the shield 12, and thereby correctly evaluate the signal due to emission of ultraviolet rays originated by alpha rays from the measurement object.

Fourth Embodiment

Figure 5:
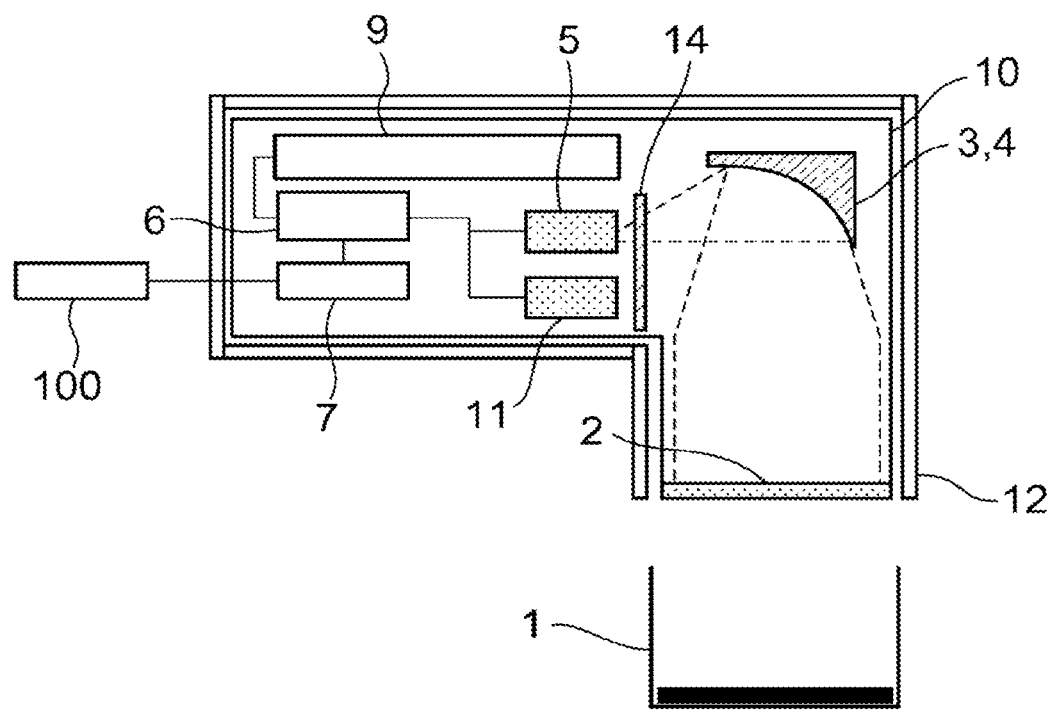
FIG. 5 is a configuration diagram showing an alpha ray observation device according to a fourth embodiment.

An alpha ray observation device and an alpha ray observation method according to a fourth embodiment of the present invention are described. FIG. 5 is a configuration diagram showing the alpha ray observation device according to the fourth embodiment of the present invention. In FIG. 5, the configuration elements analogous to those of FIGS. 1 to 4 are assigned the same signs. Redundant detailed description of these elements is omitted.

The alpha ray observation device in FIG. 5 is a further modified example of the alpha ray observation device of the third embodiment shown in FIG. 4, and is also applicable to the alpha ray observation devices of the embodiments shown in FIGS. 1 to 3.

In the alpha ray observation device in FIG. 5, a wavelength selector 14 is provided at the front of the detection elements of the first optical detector 5 and the second optical detector 11 of the alpha ray observation device of the third embodiment shown in FIG. 4. It is only required that the wavelength selector 14 is provided on the optical path of the ultraviolet rays that have been originated by alpha rays from the measurement object and entered the detection element of the first optical detector 5. In FIG. 5, the selector is provided between the condenser 3 and the first optical detector 5. Alternatively, the selector may be disposed between the incident window 2 and the condenser 3. In FIG. 5, the single wavelength selector 14 that covers both the detection element of the first optical detector 5 and the detection element of the second optical detector 11, which are arranged in parallel to each other, is adopted. Alternatively, the detection element of the first optical detector 5 and the detection element of the second optical detector 11 may be separately provided with respective wavelength selectors 14. In the case where the detection element of the first optical detector 5 and the detection element of the second optical detector 11 are thus provided with the respective wavelength selectors 14, it is preferred that the wavelength selectors 14 have the same optical characteristics. What can select the wavelength, such as a glass filter, an interference filter, or a prism, may be adopted as the wavelength selector 14. The other configuration elements are analogous to those of the alpha ray observation device according to the third embodiment.

The operation of the thus configured alpha ray observation device according to the fourth embodiment and the alpha ray observation method are hereinafter described.

In a case where the measurement object contains beta rays or gamma rays, there is a possibility that beta rays or gamma rays react with the incident window 2 to emit light. The fourth embodiment correctly evaluates the signal due to emission of ultraviolet rays originated by alpha rays even in such situations.

That is, when beta rays and gamma rays emit light at quartz glass, such as of the incident window 2, the emission wavelength is different from the wavelength of ultraviolet rays originated by alpha rays. In this embodiment, the wavelength selector 14 is provided on the optical path of ultraviolet rays that have been originated by alpha rays from the measurement object and entered the detection element of the first optical detector 5, and the wavelength of rays entering the detection element of the first optical detector 5 is selected by the wavelength selector 14. This selection can reduce the light emission from the quartz glass, such as of the incident window 2, due to beta rays and gamma rays.

This embodiment can exert advantageous effects analogous to those of the first to third embodiments. Furthermore, this embodiment can correctly evaluate the signal due to emission of ultraviolet rays originated by alpha rays from the measurement object even in a case where the incident window 2 emits light owing to beta rays and gamma rays.

Fifth Embodiment

Figure 6:
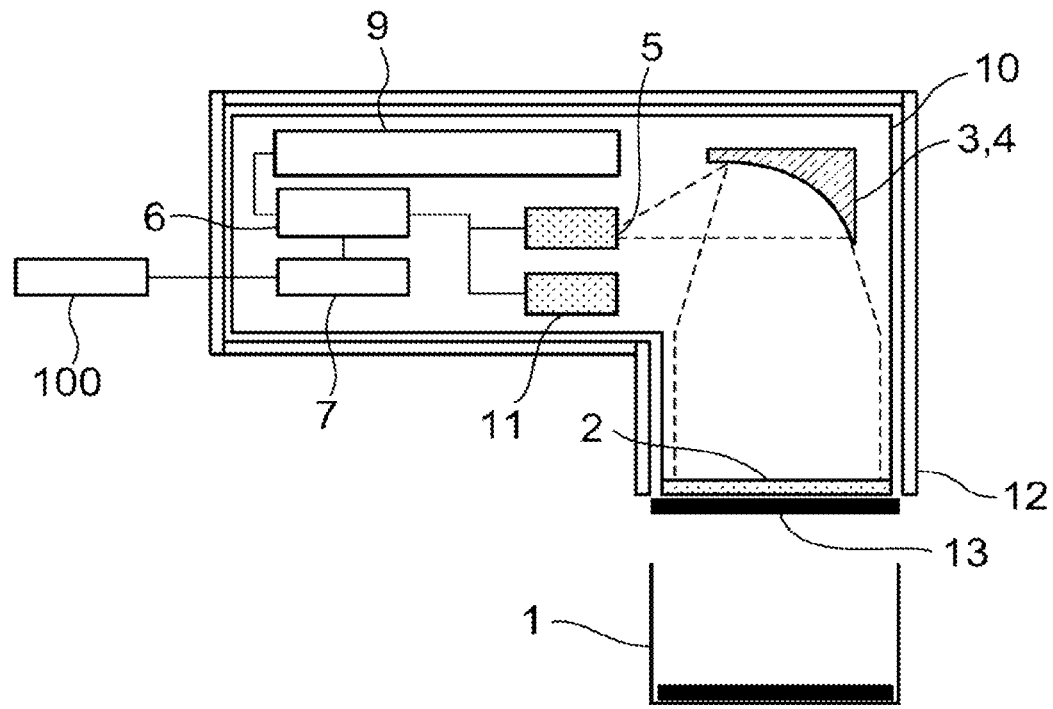
FIG. 6 is a configuration diagram showing an alpha ray observation device according to a fifth embodiment.

An alpha ray observation device and an alpha ray observation method according to a fifth embodiment of the present invention are described. FIG. 6 is a configuration diagram showing the alpha ray observation device according to the fifth embodiment of the present invention. In FIG. 6, the configuration elements analogous to those of FIGS. 1 to 5 are assigned the same signs. Redundant detailed description of these elements is omitted.

The alpha ray observation device in FIG. 6 is a further modified example of the alpha ray observation device of the fourth embodiment shown in FIG. 5, and is also applicable to the alpha ray observation devices of the embodiments shown in FIGS. 1 to 4.

The alpha ray observation device in FIG. 6 is the alpha ray observation device of the fourth embodiment shown in FIG. 5 further provided with a shutter 13 at the front of the incident window 2, that is, on the measurement chamber 1 side. The shutter 13 has a configuration that can block rays having wavelengths ranging from those of ultraviolet rays to visible rays and beta rays, and is configured to be supplied with power from the power source 9 and operated to be opened and closed according to an operation signal from the signal communicator 7. The other configuration elements are analogous to those of the alpha ray observation device according to the fourth embodiment.

The operation of the thus configured alpha ray observation device according to the fifth embodiment and the alpha ray observation method are hereinafter described.

The signal detected by the first optical detector 5 contains emitted light originated by alpha rays, emitted light originated by beta rays, and emitted light originated by gamma rays. The fourth embodiment reduces the adverse effects of emitted light originated by gamma rays by particularly detecting the light originated only by gamma rays and taking the difference.

In this embodiment, in a state where the shutter 13 is opened, rays having wavelengths ranging from those of ultraviolet rays to visible rays are detected by the first optical detector 5. Consequently, emitted light originated by alpha rays, beta rays, and gamma rays are measured.

Furthermore, the emitted light is measured in a state where the shutter 13 is closed. As described above, the shutter 13 is configured to be capable of blocking rays having wavelengths ranging from those of ultraviolet rays to visible rays and beta rays. Consequently, rays except emitted rays that have been originated by gamma rays and have a high transmission power are removed by the shutter 13. Consequently, the signal detected by the first optical detector 5 in the state where the shutter 13 is shut can be identified as a signal due to emission of rays originated by gamma rays.

Only the signal based on emission of rays originated by alpha rays and beta rays can be measured by subtracting the data on the signal detected by the first optical detector 5 when measurement is made with the shutter 13 being closed from the data on the signal detected by the optical detector when measurement is made with the shutter 13 being opened. In this embodiment, the order of the measurement with the shutter 13 being opened and the measurement with the shutter 13 being closed can be appropriately inverted.

This embodiment can exert advantageous effects analogous to those of the first to fourth embodiments. Furthermore, this embodiment can reduce the adverse effect of emitted rays originated by the gamma rays and correctly evaluate the signal due to emission of ultraviolet rays originated by alpha rays from the measurement object even in a case with the measurement object and measurement environment having much emission of rays originated by gamma rays.

Figure 7:
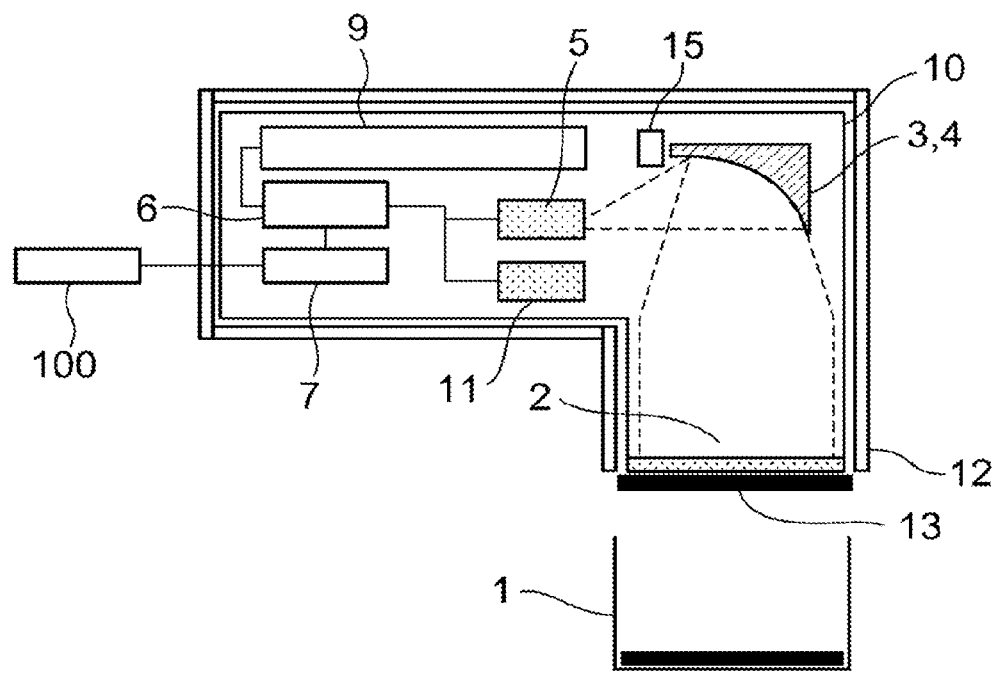
FIG. 7 is a configuration diagram showing a modified example of an alpha ray observation device according to the fifth embodiment.

FIG. 7 shows a further modified example of this embodiment. In FIG. 7, the configuration elements analogous to those of FIGS. 1 to 6 are assigned the same signs. Redundant detailed description of these elements is omitted.

In the modified example shown in FIG. 7, an environment light intensity meter 15 is provided between the incident window 2 and the first optical detector 5 in the device housing 10 of the alpha ray observation device shown in FIG. 6. The environment light intensity meter 15 may be any meter that can measure strong light (rays with a high intensity), such as illumination or sunlight, when the light enters. For example, as shown in FIG. 7, this meter is arranged in proximity to the condenser 3 or the optical path changer 4 in the device housing 10, that is, in proximity to the optical path in the device housing 10. This arrangement allows rays with a high intensity to be detected when the rays are incident. The environment light intensity meter 15 operates with power source being supplied from the power source 9. Upon detection of entering rays with a high intensity at least a predetermined intensity, this meter outputs the detection signal to the signal communicator 7. Here, the intensity of rays serving as a threshold for output of the detection signal as a high intensity may be preset to a slightly low intensity having an allowance with reference to the intensity of the rays, for example, on the basis of the intensity of rays where the measurement performances of the first optical detector 5 and the second optical detector 11 vary.

The emitted rays detected by the first optical detector 5 and the second optical detector 11 are light emission in the photon level in many cases. Detectors having a high sensitivity are often adopted as the first optical detector 5 and second optical detector 11 accordingly. In a case of such an optical detector with a high sensitivity is adopted as the first optical detector 5 or the second optical detector 11, there is a possibility that the measurement performance temporarily or permanently varies when external strong rays enter by the measurement chamber 1 being taken out of the device housing 10 for some reason with the first optical detector 5 or the second optical detector 11 being in operation when, in particular, measurement is made in the state with the shutter 13 being open.

Thus, the environment light intensity meter 15 is provided in proximity to the optical path or the like in the device housing 10 in this modified example. When the environment light intensity meter 15 detects rays with a high intensity, this meter outputs the detection signal to the signal communicator 7. Upon receipt of the detection signal indicating that rays with a high intensity have entered, the signal communicator 7 outputs a signal for turning off the shutter 13 or a signal for turning off the power of the first optical detector 5 and the second optical detector 11 to the shutter 13 or the first optical detector 5 and second optical detector 11.

Thus, the shutter 13 is closed or the power sources of the first optical detector 5 and second optical detector 11 are turned off to thereby allow the performances of the first optical detector 5 and second optical detector 11 to be maintained constant. When the environment light intensity meter 15 detects rays with a high intensity, the shutter 13 can be closed and the power sources of the first optical detector 5 and second optical detector 11 can be turned off. The control of turning off the first optical detector 5 and the second optical detector 11 when the environment light intensity meter 15 detects that the rays with a high intensity have entered is applicable not only to the fifth embodiment shown in FIG. 6 but also to the embodiments shown in FIGS. 1 to 4.

Sixth Embodiment

Figure 8:
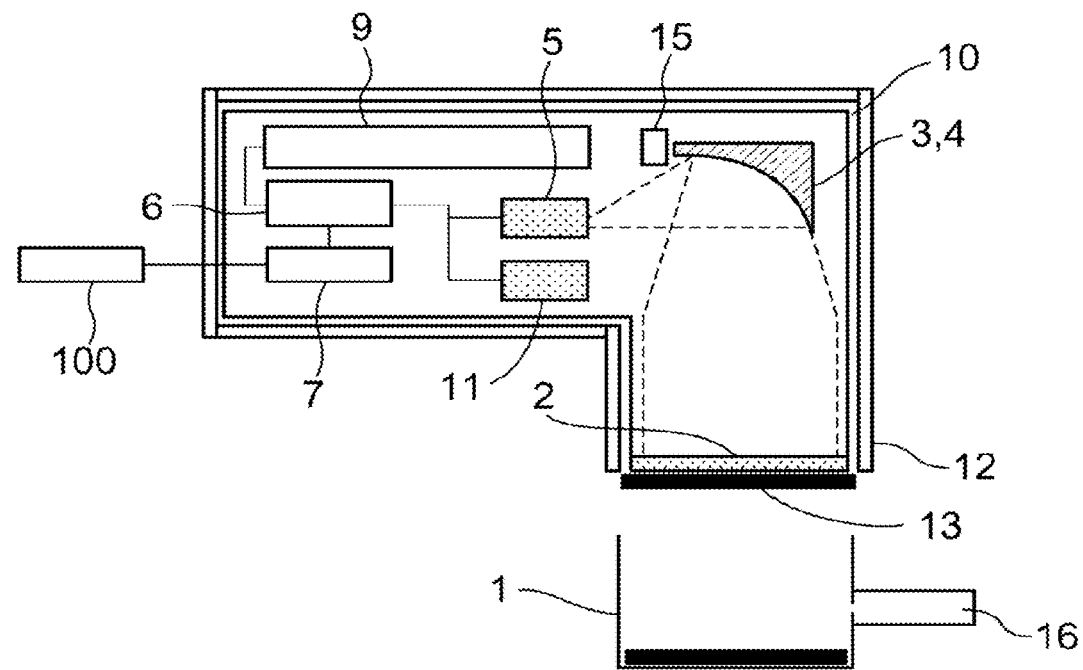
FIG. 8 is a configuration diagram showing an alpha ray observation device according to a sixth embodiment.
Figure 9:
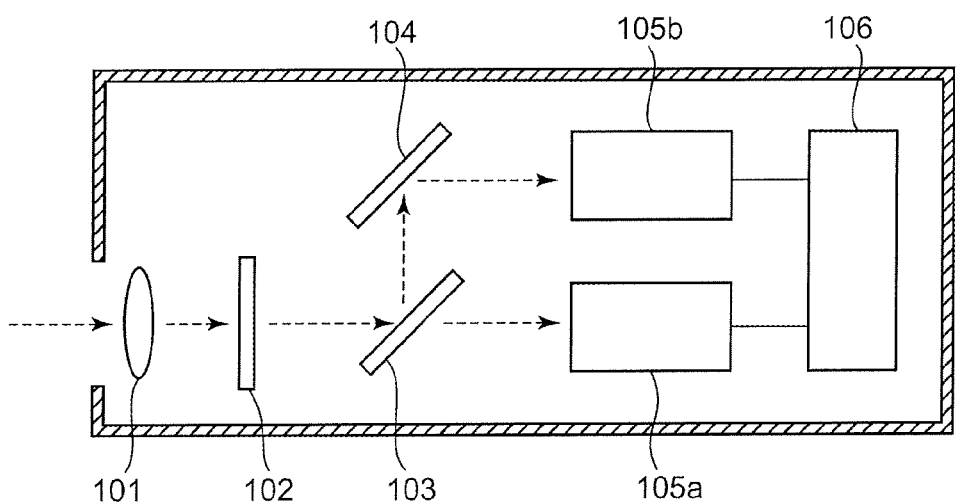
FIG. 9 is a configuration diagram showing an example of a conventional alpha ray observation device.

An alpha ray observation device and an alpha ray observation method according to a sixth embodiment according to the present invention are described. FIG. 8 is a configuration diagram showing the alpha ray observation device according to the sixth embodiment of the present invention. In FIG. 8, the configuration elements analogous to those of FIGS. 1 to 7 are assigned the same signs. Redundant detailed description of these elements is omitted.

The alpha ray observation device in FIG. 8 is a further modified example of the modified example of the alpha ray observation device of the fifth embodiment shown in FIG. 7, and is also applicable to the alpha ray observation devices of the embodiments shown in FIGS. 1 to 6.

The alpha ray observation device in FIG. 8 is the alpha ray observation device of the modified example of the fifth embodiment shown in FIG. 7 further provided with a gas blower 16 between the incident window 2 and the measurement object in the measurement chamber 1. This embodiment illustrates an example where the gas blower 16 is provided outside of the measurement chamber 1. Alternatively, another configuration may be adopted where any element capable of blowing gas, described later, between the incident window 2 and the measurement object in the measurement chamber 1, particularly around the measurement object, is provided outside or inside of the device housing 10 instead of the measurement chamber 1. The gas to be blown by the gas blower may be any of gases that emit light owing to alpha rays. For example, nitrogen, argon, xenon or the like may be adopted. Furthermore, it is preferred that the measurement chamber 1 have a configuration that allow the air in the chamber to go out when the gas be blown by the gas blower 16. The other configuration elements are analogous to those of the modified example of the alpha ray observation device according to the fifth embodiment.

The operation of the thus configured alpha ray observation device according to the sixth embodiment and the alpha ray observation method are hereinafter described.

Alpha rays emitted from the measurement object in the measurement chamber 1 react with nitrogen in the air and emit ultraviolet rays. However, some of the rays react with oxygen in the air and are quenched. Consequently, only a part of the amount of emitted rays reaches the first optical detector 5 in principle. For example, the quenching ratio can be calculated by the following Stern-Volmer equation, where I is the amount of rays after quenching, $I_o$ is the amount of rays before quenching, K is a constant, and c is the ratio of gas that is a cause of quenching.

$$I=I_o\{1/(1+K \cdot c)\}$$

Here, in a case where oxygen in the air is the cause of quenching, c is the oxygen concentration in the air and is approximately 0.2, and the constant K is 20. Consequently, according to the above equation, in a case where the atmosphere in the measurement chamber 1 is the air, light emitted from nitrogen due to alpha rays caused from the measurement object is quenched to an extent ⅕ as much by the oxygen in the air.

Consequently, in this embodiment, nitrogen or the like is blown in the measurement chamber 1, in particular, around the measurement object by the gas blower 16. This configuration can reduce the ratio of oxygen, which is the cause of quenching, and in turn reduce quenching. This reduction increases the amount of rays originated by alpha rays, and can facilitate alpha ray measurement.

This embodiment can exert advantageous effects analogous to those of the first to fifth embodiments. Furthermore, this embodiment can increase the amount of rays originated by alpha rays, and correctly evaluate the signal due to emission of ultraviolet rays originated by alpha rays from the measurement object.

Some embodiments of the present invention have thus been described. These embodiments have been presented as examples. There is no intention to limit the scope of the invention. These novel embodiments can be implemented in other various forms. Various omissions, replacements and modifications can be made in a range without departing from the gist of the invention. These embodiments and their modifications are included in the scope and gist of the invention, and included in the scope of the invention described in the claims and their scopes of equivalents.

REFERENCE SIGNS LIST

1 . . . Measurement chamber
2 . . . Incident window
3 . . . Condenser
4 . . . Optical path changer
5 . . . Optical detector (first optical detector)
6 . . . Signal detector
7 . . . Signal communicator
9 . . . Power source
10 . . . Device housing
11 . . . Second optical detector
12 . . . Shield
13 . . . Shutter
14 . . . Wavelength selector
15 . . . Environment light intensity meter
16 . . . Gas blower
100 . . . Display

The invention claimed is:

1. An alpha ray observation device, comprising:
a device housing having an opening;
an incident window that is provided at the opening, allows beta rays to be blocked, and allows emitted light originated by alpha rays emitted from a measurement object set outside of the device housing to enter an inside of the device housing;
a condenser that is provided in the device housing, and condenses the emitted light;
an optical path changer that is provided in the device housing, and changes an optical path of the emitted light from an incident direction from the incident window; and
a first optical detector that is provided in the device housing, and detects the emitted light which has been condensed by the condenser and whose optical path has been changed by the optical path changer,
wherein the emitted light is caused by gas excited with the alpha ray.

2. The alpha ray observation device according to claim 1, wherein the device housing is configured to prevent light from entering the inside of the device housing except through the opening at which the incident window is provided.

3. The alpha ray observation device according to claim 1, further comprising a measurement chamber one side of which is connectable to the opening of the device housing and on another side of which the measurement object is set.

4. The alpha ray observation device according to claim 3, wherein the measurement chamber is configured to prevent light outside of the measurement object from entering the inside of the device housing from the incident window in a state where the measurement chamber is connected to the device housing and the measurement object is set in the chamber.

5. The alpha ray observation device according to claim 3, wherein a distance between the one side and the another side of the measurement chamber is configured to be a distance at least a range of alpha rays.

6. The alpha ray observation device according to claim 1, further comprising a second optical detector at a position which is in the device housing and on which the emitted light is not incident.

7. The alpha ray observation device according to claim 1, further comprising a shield that covers the device housing except the opening and blocks gamma rays.

8. The alpha ray observation device according to claim 1, further comprising a wavelength selector that selects a wavelength of the emitted light allowed to enter the first optical detector.

9. The alpha ray observation device according to claim 1, further comprising a shutter that blocks rays having wavelengths in a range from wavelengths of ultraviolet rays to visible rays, and beta rays, between the incident window and the measurement object.

10. The alpha ray observation device according to claim 1, further comprising, in the device housing, an environment light intensity meter that detects that light having a predetermined high intensity has entered through the incident window.

11. The alpha ray observation device according to claim 1, further comprising a gas blower that blows gas, between the incident window and the measurement object.

12. The alpha ray observation device according to claim 1, wherein the gas is nitrogen.

13. An alpha ray observation method, comprising:
setting a measurement object outside of a device housing;
allowing emitted light originated by alpha rays emitted from the measurement object to enter an inside of the device housing while blocking beta rays;
condensing the emitted light having entered the inside of the device housing, while changing an optical path of the light; and
detecting the emitted light which has been condensed and whose optical path has been changed, and outputting a detection signal according to an amount of the emitted light,
wherein the emitted light is caused by gas excited with the alpha ray.

14. The alpha ray observation method according to claim 13, wherein the gas is nitrogen.

\* \* \* \* \*